United States Patent [19]
Haggerty

[11] 4,289,952
[45] Sep. 15, 1981

[54] PROCESS FOR CONTROLLING POWDER SIZE WITH OPTICAL ENERGY

[75] Inventor: John S. Haggerty, Lincoln, Mass.

[73] Assignee: Massachusetts Institute of Technology, Cambridge, Mass.

[21] Appl. No.: 102,608

[22] Filed: Dec. 12, 1979

[51] Int. Cl.³ .............................................. B23K 9/00
[52] U.S. Cl. ........................ 219/121 L; 501/154; 501/97; 501/1; 75/0.8 B; 148/126; 219/121 LH; 219/121 LJ; 219/121 LM; 219/121 LN; 219/121 LU; 423/324; 423/344; 250/432 R
[58] Field of Search ............ 75/0.5 R, 0.5 B, 0.5 BA, 75/0.5 BB, 0.5 BC, 0.5 C; 425/174.4; 250/527; 148/432 R, 9.5, 126; 219/121 LE, 121 LH, 121 LJ, 121 LM, 121 L, 121 LN, 121 LF, 121 LU; 204/157.1 R, 157.1 H; 423/324, 344; 241/1, 23, 30; 264/15; 427/53.1; 106/39.5, 73.5, 55, 288 B

[56] References Cited
U.S. PATENT DOCUMENTS

| | | | |
|---|---|---|---|
| 3,290,723 | 12/1966 | Jaques et al. | 425/174.4 |
| 3,539,221 | 11/1970 | Gladstone et al. | 219/121 LU |
| 4,005,956 | 2/1977 | Inoue | 250/432 R |
| 4,200,669 | 4/1980 | Schaefer et al. | 219/121 L |

FOREIGN PATENT DOCUMENTS

| | | | |
|---|---|---|---|
| 2351675 | 4/1975 | Fed. Rep. of Germany | 241/1 |
| 1273523 | 5/1972 | United Kingdom | 241/1 |
| 452429 | 5/1975 | U.S.S.R. | 75/0.5 R |

*Primary Examiner*—Michael L. Lewis
*Attorney, Agent, or Firm*—Arthur A. Smith, Jr.

[57] ABSTRACT

Metal or ceramic powders having a narrow size distribution are produced by passing a gas entrained powder through an intense light beam which couples preferentially with the larger particles to heat and selectively vaporize a portion of the larger particles until their diameter approximates the desired size.

6 Claims, 5 Drawing Figures

PROCESS FOR CONTROLLING POWDER SIZE WITH OPTICAL ENERGY

BACKGROUND OF THE INVENTION

The Government has rights in this invention pursuant to Contract No. N00014-77-C-0581 and IPA-0010 awarded by the Defense Advanced Research Projects Agency.

This invention relates to a process for producing ceramic and other particles having a narrow size distribution range.

It is well established about twenty years ago that ceramic materials could be densified by diffusional sintering processes to theoretical density. The paradigms for this process have been established for oxides, but are less well defined for the covalent materials such as silicon carbide and silicon nitride. As the latter are being considered for high temperature structural applications, the requirements of theoretical density, uniform grain size, and elimination of flaws is fundamental to their eventual incorporation in power machinery. The ideal sinterable powder, such as ceramic or metal powders, having the following general characteristics: (1) fine grain size, generally less than about 0.5 microns; (2) non-agglomerated particles, i.e., individual crystallites; (3) a narrow distribution in the sizes of the particles; (4) the morphology equiaxed, tending towards spherical; (5) phase purity, i.e., no mix of polymorphic crystal structures or glass phases; (6) compositional purity. Powders with these characteristics could be sintered to theoretical density and the grain morphology could be controlled to give useful high temperature properties.

There have been significant improvements in recent years in the preparation of fine ceramic powders such as silicon nitride and silicon carbide powders. Most of these techniques involve DC arcs, although conventional vapor phase reactions in heated furnaces and nitriding or carbiding of silicon metal has been used more extensively. The nitriding of silicon metal inevitably leaves a silicon core within the silicon nitride particle. Furthermore, because the process is done in the solid state, grinding and separating of particles is necessary, but this does not result in narrow size distribution, non-agglomerated, phase pure powders. The vapor phase methods (the furnace heated vapor and the arc plasma techniques) yield a finer and more uniform powder than the nitriding of solid silicon; but these techniques have less than ideal thermal profiles and reaction zones which allow for a distribution in nucleation times and growth of agglomerates. The present vapor phase processes are undesirable in that the reaction volume is not concentrated so that reaction can occur even on the hot walls of the reaction chamber. Furthermore, precise control of particle nucleation is not attained because of the thermal gradients within the reaction zone and relatively long exposure times of the reactants.

SUMMARY OF THE INVENTION

In accordance with this invention, ceramic or metal powder materials having a particle size within a narrow size range are formed by exposing a powdered material having non-uniform particle size to a collimated beam of substantially monochromatic light. Diameter reduction of the larger size particles is achieved by heating the particles with the light beam which couples with the larger particle to heat and vaporize a portion of these particles. Vaporization of the larger particles ceases when the particle diameter approaches a specific dimension which depends on the characteristics of the light beam and the thermal and optical characteristics of the material. Typically, this dimension is within a factor of 10 larger or smaller than the wavelength of the incident light. Thus, the vaporization process intrinsically results in a classification of the ablated particles. The particles then are removed from the light beam and are collected.

BRIEF DESCRIPTION OF THE DRAWINGS

Referring to FIG. 1, the reactor apparatus 10 includes a window 12 through which a laser beam 14 is directed into the interior 16 of the apparatus 10. The window 12 is held in place by means of plate 18, screws 20, support 22 and "O" rings 24 and 26. Accumulation of powder on the interior surface of window 12 is prevented by passing an inert gas past the interior surface of the window 12 through gas inlets 28 and 30. The particles to be treated are introduced into reactor apparatus 10 through inlet 32. The particles introduced through inlet 32 are confined to the mid portion of the reactor apparatus 10 by means of an envelope of inert gas which is introduced into tube 34 through gas inlet 36. The particles pass through laser beam 14 onto a filter located downstream from tube 50. Powder product is deposited on the filter and inert gas passes through the filter under the influence of a vacuum downstream of the filter. The laser beam inpinges upon a copper heat sink 52 which is cooled by water passing through conduit 54.

Apparatus 10 has been operated in both a vertical mode and a horizontal mode. In a vertical mode, the particles pass through tube 32 oriented vertically upward with the laser beam 14 passing through the cell in a horizontal direction. In a horizontal mode, the particles enter the cell horizontally and intersects the laser beam 14 which is directed vertically from above. The former mode is preferred because it takes advantage of buoyance forces which help carry powder up into the filter. It is not critical to the present invention to utilize a particular relative flow arrangement of reactant gas and laser beam propagation. For example, one can utilize cocurrent, countercurrent or crossflow.

The powdered materials treated in accordance with this invention can be metal powder or ceramic powders such as are utilized in conventional sintering processes or as fillers. These feed powdered materials can be obtained from any conventional source such as from grinding and classification processes or conventional powder forming processes such as those utilizing plasmas. The powdered feed material then is directed into the path of a collimated light beam of essentially monochromatic light such as a laser beam. The powdered material can be entrained into the path of the beam such as with an inert gas carrier or directed across the beam. In any event, the residence time of the powder in the beam is sufficient to effect the desired selective radiation. The light beam should have a power of at least about $10^4$ watts/cm$^2$, preferably at least about $10^8$ watts/cm$^2$ in order to obtain the desired rate of surface vaporization from the powder.

The maximum possible vaporization rate (J) from a surface at a temperature T is given by:

$$J = (P_e - P)(2\pi MRT)^{-\frac{1}{2}}$$

where $(P_e - P)$ is the difference between the equilibrium vapor pressure of the volatile species $(P_e)$ and its pressure in the ambient (P). The molecular weight of the species is M. With R in units of erg/° C. mole and P's in dynes/cm$^2$, J has the units moles/cm$^2$ sec. Given this general relationship, the time required in the beam to attain the desired particle size reduction can be determined easily from the vaporization rate calculated and the knowledge of the average particle size of the feed material.

It is also desirable to effect vaporization in a manner which minimizes selective vaporization of a component of the particles so that compositional changes of the particle is minimized. To avoid a compositional change, the molar vaporization rates of constituent elements must be equal in ratio to the bulk composition. For $Si_3N_4$, vaporization probably proceeds by dissociation as $$Si_3N_4(s) \rightarrow 3Si(s,l) + 2N_2(g)$$

followed by $$Si(s,l) \rightarrow Si(g).$$

Figure 2:
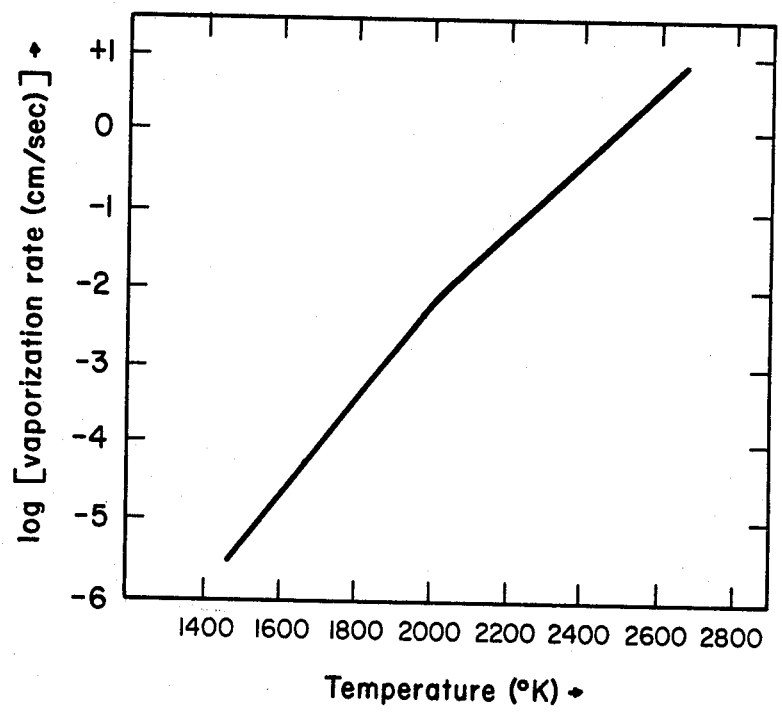
FIG. 2 is a graph of the vapor pressure of Si (g) and $N_2$ (g) as a function of temperature.

If stoichiometric vaporization is to be achieved ($J_{Si} = 3/2\ J_{N2}$), then $P_{Si} = 1.5\ P_{N2}$. The $N_2$ dissociation pressure of $Si_3N_4$ and the Si vapor pressure for Si(s,l) are shown in FIG. 2. It shows that this pressure ratio is not achieved over the temperature range of interest and that nitrogen will be lost preferentially from the surface, if vaporization occurs in a low pressure. It can be assumed that the preferential $N_2$ loss will produce a compositional gradient in the particles with steady state surface $N_2$ and Si activities which give stoichiometric vaporization rates. In this case, the overall rate can be approximated at being controlled by $J_{Si}$; therefore, $J_{Si_3N_4} = \frac{1}{3} J_{Si}$. Silicon vaporization rates ($J_{Si}$) are then estimated from unit activity Si. Alternately, the nitrogen pressure can be raised in the ambient to suppress the excessive $N_2$ vaporization rate. This would also be advantageous since the $N_2$ rich surfaces will be less susceptible to $O_2$ contamination than Si rich surfaces.

Figure 3:
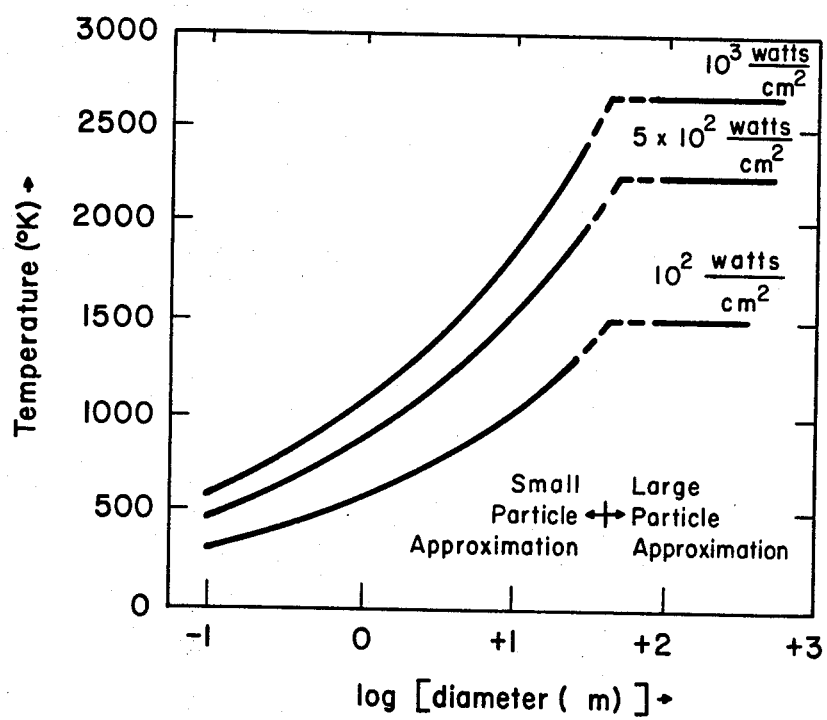
FIG. 3 shows the steady state temperature of $Si_3N_4$ as a function of particle size when exposed to 10.6 $\mu$m light.

Linear vaporization rates calculated for $Si_3N_4$ surface temperatures ranging from 1500°–2600° K., based on FIG. 2. Steady state temperatures for $Si_3N_4$ particles shown in FIG. 3, were used to estimate the vaporization rates shown in FIG. 4, as a function of particle size for 10.6 $\mu$m power densities ranging from $10^2$ to $10^3$ watts/cm$^2$.

Particles with diameters in excess of 45 $\mu$m will vaporize at rates which are independent of their diameter but strongly dependent on the power density of the laser radiation. Below 45 $\mu$m, the vaporization rate becomes a strong function of diameter, decreasing seven orders of magnitude for particle diameters decreasing from 45 to 4.0 $\mu$m. This rapidly decreasing vaporization rate causes the final particle size to be insensitive to the initial particle size, and directly controllable with exposure time and power density. These points are illustrated as follows.

The rate of change of particle diameter (dd/dt) is related to the vaporization velocity (v) by:

$$dd/dt = 2v$$

Figure 4:
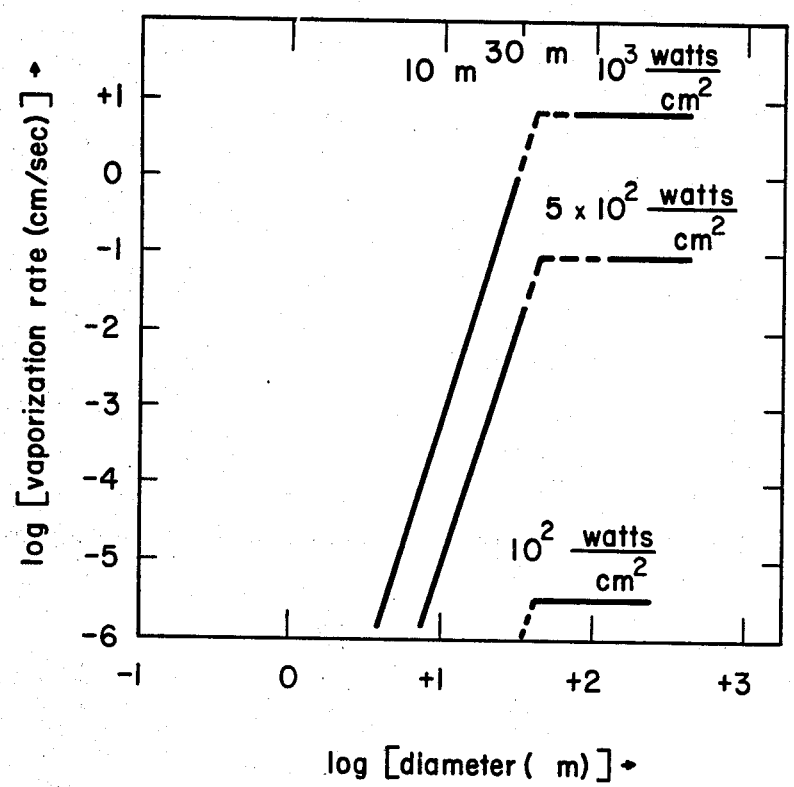
FIG. 4 shows the vaporization rates of $Si_3N_4$ as a function of particle size when exposed to 10 $\mu$m light.

The small particle region of the v(d) curves in FIG. 4, are represented by $$\log(v) = \log(a) + b\ \log(d)$$

so that $$v = ad^b.$$

Substituting this into dd/dt and integrating gives $$d = d_o^{(1-b)} - 2a(1-b)\ \Delta t^{1/1-b}$$

where t is the exposure time. The final particle diameters (d) are given below for the various exposure times (t) in beams having power densities equal to $5 \times 10^2$ and $10^3$ watts/cm$^2$ for $Si_3N_4$ particles having initial diameters ($d_o$) equal to 30 and 45 $\mu$m.

| $\Delta t$ (sec) | 500 watts/cm$^2$ | | 1000 watts/cm$^2$ | |
| --- | --- | --- | --- | --- |
| | $d_o = 30\ \mu m$ | $d_o = 45\ \mu m$ | $d_o = 30\ \mu m$ | $d_o = 45\ \mu m$ |
| $10^{-4}$ | 30.0 | 44.7 | 28.3 | 34.0 |
| $10^{-4}$ | 29.8 | 42.9 | 22.6 | 23.4 |
| $10^{-2}$ | 28.5 | 39.1 | 15.5 | 15.6 |
| $10^{-1}$ | 23.2 | 24.4 | 10.4 | 10.4 |
| 1 | 16.2 | 16.2 | 6.9 | 6.9 |

For exposure times longer than a specific level the final particle sizes are virtually independent of the initial particle size. For this rate controlling mode with an intensity of $5 \times 10^2$ watts/cm$^2$, this occurs at approximately $10^{-1}$ seconds and for $10^3$ watts/cm$^2$ at $10^{-3}$ seconds. In both cases particles ablate at equal rates after reaching approximately 23 $\mu$m.

These analyses illustrate the effectiveness of the laser ablative process for creating particles with narrow particle size distributions. The final particle size is weakly sensitive to exposure time. It only varies by a factor of 2–4 with exposures ranging from $10^{-4}$ to 1 second. Power density has a stronger influence, but is still easily controllable. A specific maximum particle size can be created by adjusting laser power and exposure time; e.g., 15 $\mu$m diameter particles will be produced by passing particles through a $10^3$ watt/cm$^2$ beam, 1 cm in path length at 1 meter/sec. The particle diameter can be increased or decreased by adjusting velocity or power density (either by changing the power level or changing the beam diameter at fixed power level). Smaller particle sizes can be achieved by longer exposures to higher intensity beams.

Other limiting steps in the vaporization process can be rate limiting. With absorbed power being rate limiting, the diameter reduction rate (dd/dt) is given by $$\frac{dd}{dt} = -\frac{MIQ_{abs}}{2\rho \Delta H}$$

where
M = molecular weight
$\rho$ = density of the particle
I = local beam intensity ΔH = molar heat of vaporization
$Q_{abs}$ = absorption efficiency.

For large particles, the absorption efficiency is independent of particle size, and the diameter reduction rate is constant. For small particles it is approximated as linearly dependent on particle size ($Q_{abs} \simeq Cd$) where the proportionality constant (C) is dependent on optical properties of the constituent materials. Thus, for small particles the diameter reduction decreases with time. This again causes the comminution process to effectively stop once a specific diameter rate is reached.

It is apparent that the wavelength of the laser light has a major effect on the diameter range over which the process works most effectively. Final particle diameters tend to be within a factor of 10, larger or smaller than the wavelength of the light for materials having the optical characteristics used in these calculations. Representative suitable light sources include lasers such as Nd: YAG, Ruby, carbonmonoxide, carbondioxide or various dye lasers with the shorter wavelength lasers being preferred to produce powders for sintering, i.e., less than about 1 $\mu$m. Also, other broad band light sources will produce the same general effects on absorbing particles. Representative suitable light sources include xenon lamps, and sodium lamps which emit nearly monochromatic light. Conventional optics are used in conjunction with the broad band sources to produce a collimated light beam. It is preferred to employ a laser since it will produce a collimated monochromatic light beam intrinsically. It is to be understood that optical filters can be used in combination with broad band sources to define the wavelength of the light beam, thereby to define the maximum ablated particle size.

The minimum wavelength from a truncated broad band source determines the maximum particle site found after comminution by this process as does the wavelength of a monochromatic source.

Representative suitable powdered materials which can be processes in accordance with this invention include ceramics such as silicon nitride, silicon oxide, silicon carbide, titanium oxide, aluminum oxide, magnesium oxide or the like or metal powders such as copper, iron, silicon or carbides.

The process of this invention provides substantial advantages over the prior art. It is a clean process which allows for cold, non-reactive chamber walls. The reaction volume is very well-defined and consists only of that volume traversed by reaction gases and particles, i.e., the laser beam area. The ability to have steep gradients in the effective thermal environment, and thus a well-defined reaction zone, allows precise sure times, permitting the achievement of very uniform particles.

The following examples illustrate the present invention and are not intended to limit the same.

EXAMPLE I

Figure 1:
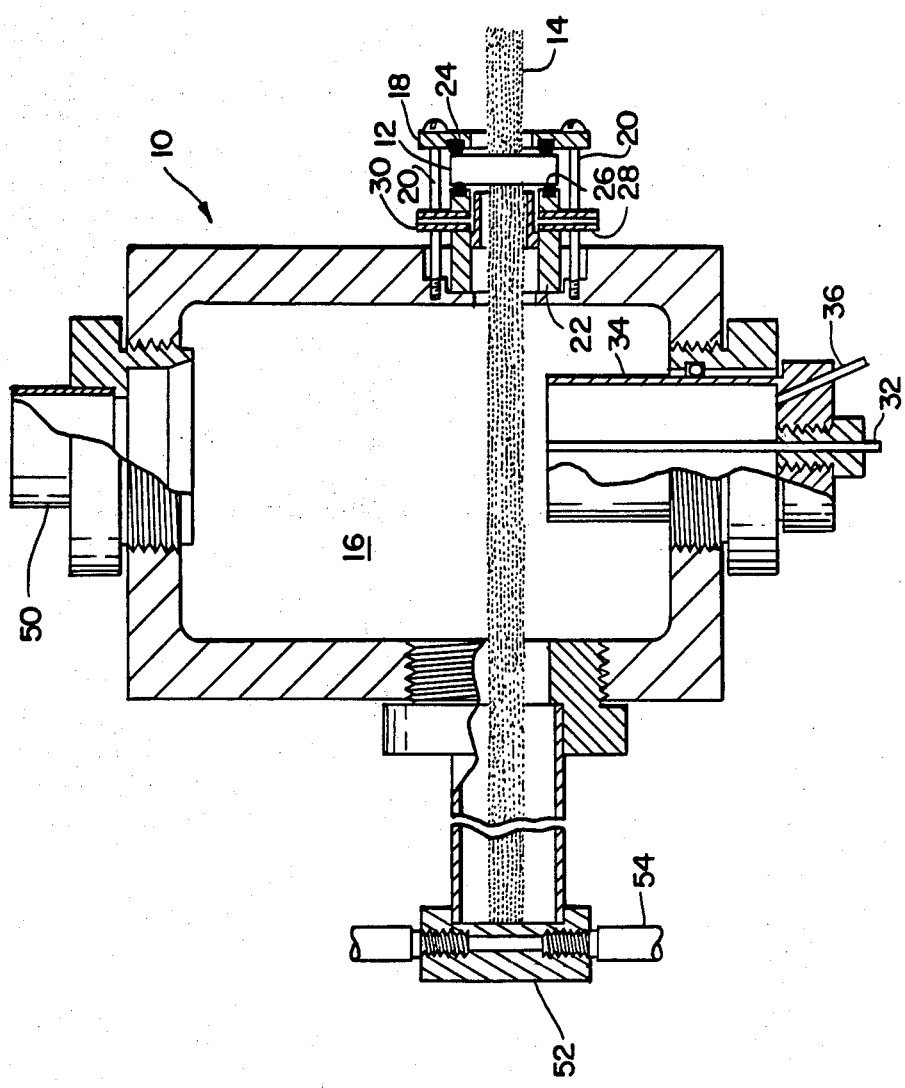
FIG. 1 is a cross-section view of an apparatus used to practice the process of this invention.
Figure 5:
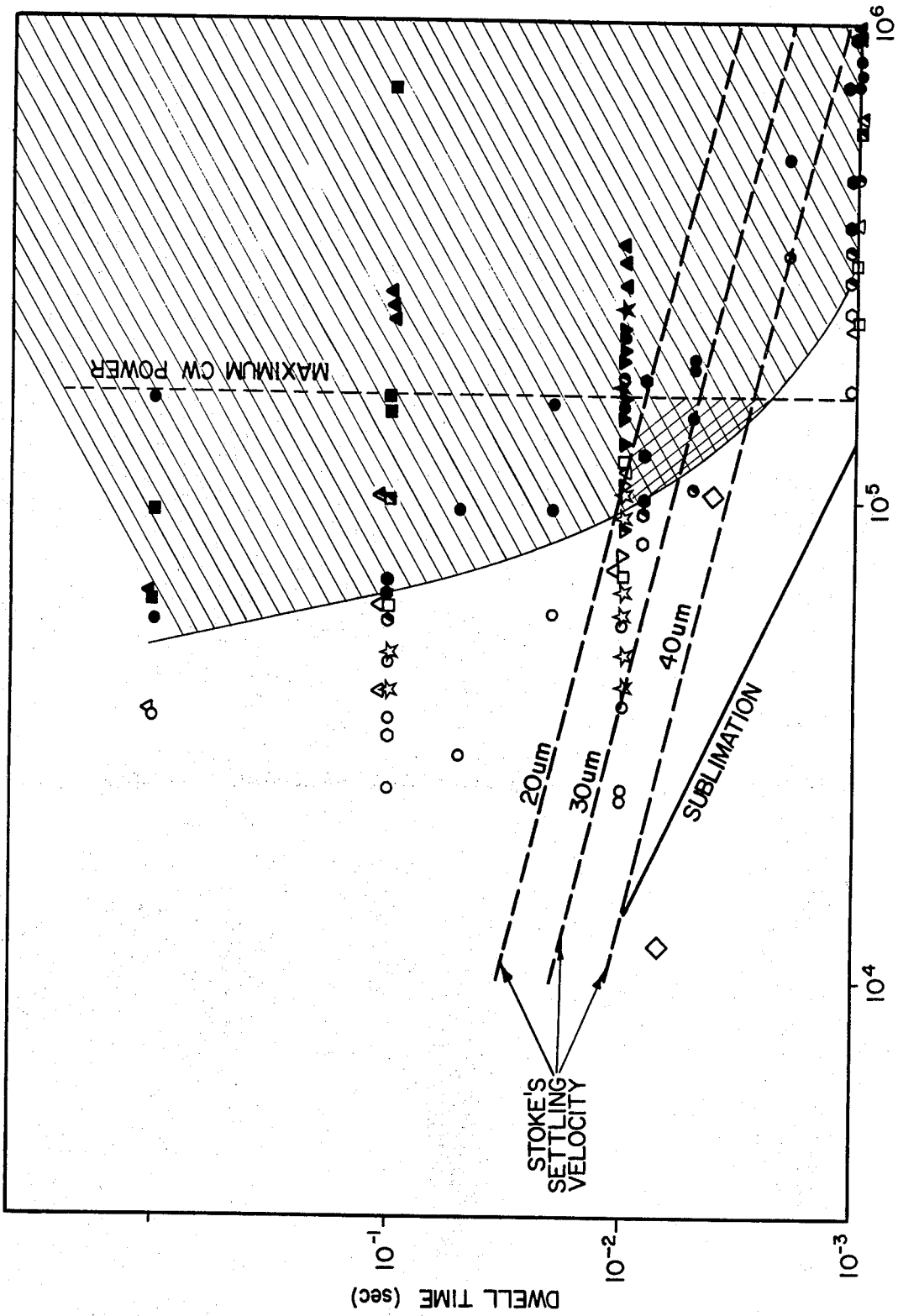
FIG. 5 shows the reduction of particle size as a function of dwell time and light intensity.

Utilizing the apparatus of FIG. 1, $Si_3N_4$ powders varying in size between about 10 and 40 $\mu$m were subjected to a laser beam emitted from a $CO_2$ laser with intensities varying between $10^4$ to $10^6$ watts/cm$^2$. The results of these comminution experiments are shown in FIG. 5. The cross hatched region of FIG. 5 indicates the various combinations of exposure time and laser intensity which caused diameter reduction. Based on these results, there is only a limited combination of laser intensities, exposure times and particle sizes for which comminution can be anticipated for entrained particles with the maximum power limitation of the 150 watt laser used for these experiments. This region, between approximately $1-1.5 \times 10^5$ watts/cm$^2$ and $2 \times 10^{-3} - 10^{-2}$ seconds is indicated by double cross hatching in FIG. 2. Experiments with gas entrained particles carried out within this intensity exposure time region demonstrates diameter reduction. Higher power $CO_2$ laser sources are required to supply the process in an unrestricted manner to $Si_3N_4$ particles.

The symbols in FIG. 5 indicate the following:

Key: Diameter Reduction:
●, ■, ▲, etc. size reduction > 50%
◐, ◪, ▲, etc. size reduction < 50%
○, □, △, etc. no size reduction Process Conditions:
○, static expt., 1 atm Ar, $d_o$ = 30–38 $\mu$m, reaction bonded $Si_3N_4$
□, static expt., 1 atm Ar, $d_o$ — 20–30 $\mu$m, reaction bonded $Si_3N_4$
△, static expt., 2 Torr air, $d_o$ = 20–30 $\mu$m, reaction bonded $Si_3N_4$
◇, static expt., 1 atm Ar, $d_o$ = 20–30 $\mu$m, hot pressed $Si_3N_4$
☆, static expt., 1 atm Ar, $d_o$ = ≦20 $\mu$m, hot pressed $Si_3N_4$
◇, flight expt., 1 atm air, $d_o$ = 20–30 $\mu$m, reaction bonded $Si_3N_4$
▽, static expt., 1 atm air, $d_o$ = 20–30 $\mu$m, reaction bonded $Si_3N_4$

I claim:

1. The process for producing a metal or ceramic powder having a narrow size distribution which comprises forming a dilute mixture of a metal or ceramic powder in a gas and passing said mixture through a collimated beam of intense light which coupled with the larger particles in said mixture to vaporize a portion of said larger particles until said larger particles have a diameter that approximates a minimum wavelength of said beam, and recovering the particles which have passed through said beam.

2. The process of claim 1 wherein said powder is a ceramic.

3. The process of claim 2 wherein said powder is silicon nitride.

4. The process of claim 1 wherein said powder is a metal.

5. The process of claim 1 wherein said light beam is a laser.

6. The process of claim 1 wherein said beam is a truncated light beam formed by passing a broad band light source through a filter thereby to reduce the wavelength of said broad band source.

* * * * *